United States Patent [19]

Carberry

[11] Patent Number: 4,966,654

[45] Date of Patent: * Oct. 30, 1990

[54] SOIL AND GROUNDWATER REMEDIATION SYSTEM

[75] Inventor: Terrance K. Carberry, Canyon Country, Calif.

[73] Assignee: AWD Technologies, Inc., South San Francisco, Calif.

[ * ] Notice: The portion of the term of this patent subsequent to Jul. 11, 2006 has been disclaimed.

[21] Appl. No.: 301,571

[22] Filed: Jan. 24, 1989

Related U.S. Application Data

[63] Continuation-in-part of Ser. No. 246,057, Sep. 19, 1988.

[51] Int. Cl.$^5$ .............................................. B10D 3/38
[52] U.S. Cl. ..................................... 202/177; 202/186; 202/202; 202/204; 202/234; 210/747; 210/170; 210/181; 210/182; 55/179
[58] Field of Search ..................... 203/87, 39, 41, 95, 203/96, 11, 22, 23, 49; 202/200, 186, 234, 202, 204, 177, 205; 55/179, 46, 48, 51, 53; 210/747, 170, 177, 181, 182, 195.1, 640

[56] References Cited

U.S. PATENT DOCUMENTS

| | | | |
|---|---|---|---|
| 2,278,999 | 4/1942 | Kuhl | 55/52 |
| 2,372,540 | 3/1945 | Balcar | 203/49 |
| 2,409,691 | 10/1946 | Noble | 55/46 |
| 2,943,703 | 7/1960 | Thayer | 55/53 |
| 3,337,422 | 8/1967 | Colton | 203/96 |
| 3,344,583 | 10/1967 | Styring et al. | 55/46 |
| 3,690,040 | 9/1972 | Halfon | 55/46 |
| 4,072,604 | 2/1978 | Ward | 55/46 |
| 4,110,370 | 8/1978 | Engelbach et al. | 55/46 |
| 4,510,242 | 4/1985 | Tedder | 203/49 |
| 4,539,077 | 9/1985 | Jonckers et al. | 203/49 |
| 4,589,896 | 5/1986 | Chen et al. | 210/640 |
| 4,595,461 | 6/1986 | Jeromin et al. | 202/186 |
| 4,640,743 | 2/1987 | Bannon et al. | 203/87 |
| 4,659,343 | 4/1987 | Kelley | 210/640 |
| 4,670,028 | 6/1987 | Kennedy | 55/179 |
| 4,670,278 | 6/1987 | Healey et al. | 203/87 |
| 4,783,242 | 11/1988 | Robbins | 203/96 |
| 4,846,934 | 7/1989 | Carberry | 202/177 |

Primary Examiner—
Assistant Examiner—Cynthia L. Nessler
Attorney, Agent, or Firm—Irell & Manella

[57] ABSTRACT

The invention is a system for removing volitile hydrocarbon contaminates from both water and moisture-ladened air. In detail the invention comprises a stripping system preferably a steam stripping system, for mixing the contaminated water with steam, at below atmospheric pressure, providing clean water for reuse and contaminated steam and vaporized hydrocarbon contaminates. A first condenser receives the contaminated steam and vaporized hydrocarbon contaminates and condenses, at below atmospheric pressure, a portion of the vaporized contaminates and a portion of the contaminated steam into contaminate water. A second condenser thereafter further condenses the steam and hydrocarbon vapor. A gravity separator thereafter receives the contaminated water from the first and second condensers and the uncondensed steam and hydrocarbon contaminates from the second condensor and provides outputs comprising: separated contaminated water for recycling; condensed hydrocarbon contaminates for reprocessing; and passes the uncondensed hydrocarbon contaminates to activated charcoal absorbers. The contaminated moisture-ladened gas is passed through a third condenser which produces contaminated water which is recycled to the steam stripping system and the remaining uncondensed hydrocarbons are passed through the activated charcoal absorbers.

3 Claims, 3 Drawing Sheets

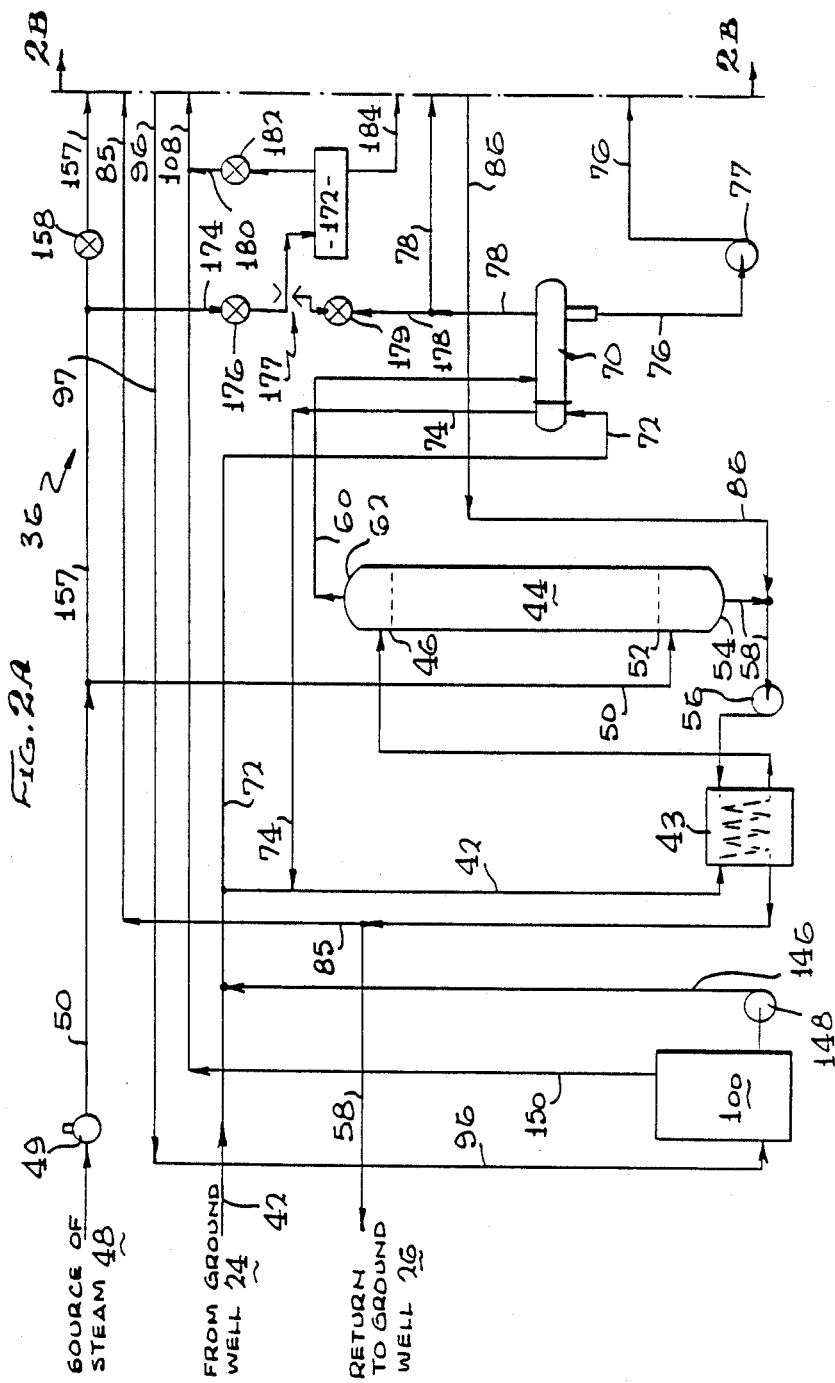

SOIL AND GROUNDWATER REMEDIATION SYSTEM

This is a continuation-in-part of copending application Ser. No. 246,057, filed Sept. 19, 1988.

TECHNICAL FIELD

The invention relates to the field of groundwater reclamation and, in particular, to a closed-loop system for removing hydrocarbon contaminates from both the groundwater and soil.

BACKGROUND INFORMATION

Groundwater contamination by hydrocarbon-based chemicals primarily occurs in industrialized areas where such chemicals are in daily use. Over a period of time, spills, and leaks from pipes, storage tanks, etc., seep into the ground and migrate into the groundwater and are spread over large underground areas. Since many communities use well water for drinking purposes, slight amounts of contaminates such as perchloralethyline and trichloralethylene, which are known to cause cancer, must be removed or reduced to safe levels. Various methods for extracting the contaminated water for processing purposes are disclosed in U.S. Pat. No. 4,611,950, "Method and Apparatus for Removing Contaminants From Soil" by Richard J. Russomano; U.S. Pat. No. 4,600,508, "Contamination Removal System" by Kenneth A. DeGhetto; U.S. Pat. No. 4,167,973, "Process for Chemical Decontamination of Layers of Earth and/or Water Contaminated with Organic Materials" by Ernst Forte, et al., and U.S. Pat. No. 4,435,292, "Portable Method for Decontaminating Earth" by James L. Kirk, et al.

After extraction, the most obvious decontamination method is to filter the water and gas through activated charcoal filters. However, the size of the filters and the amount of charcoal required, make the use of such systems prohibitively expensive for groundwater reclamation.

If it were only a matter of stripping the hydrocarbon contaminates from the water a simple steam or hot-air stripping tower could be used. In these systems, the steam or heated air is used to vaporize the hydrocarbon contaminates with the result that clean water can be extracted. However, what remains to be disposed of are contaminated steam and the vaporized hydrocarbon contaminates. In many cases, these can be released into the atmosphere. However, if no such release can be tolerated, such as in the County of Los Angeles, California, and if the contaminates must also be removed from the soil, the steam or hot-air stripping process by itself is insufficient. Furthermore, if the contamination is extensive and or if the water must be removed at a slow rate to avoid surface subsidence, a system may be in operation for a number of years. Thus, any system must make efficient use of energy. Thus, a condenser and gravity separator are used to liquify the hydrocarbons and steam exiting the strippening tower separating the two. The resulting contaminated water is recycled, while the condensed hydrocarbons are collected for subsequent processing or disposal. However, this system does not handle the problem of extraction or processing of moisture ladened soil and gas.

Therefore, a primary object of the subject invention is to provide a system for removing hydrocarbon contaminates from water and moisture ladened gases extracted from the soil.

Another primary object of the subject invention is to provide a system for removing hydrocarbon contaminates from water and moisture-ladened gas that works on a closed-loop principal with no release of contaminates to the atmosphere.

It is a further object of the subject invention to provide a system for removing hydrocarbon contaminates from water and moisture-ladened gas that is very efficient and consumes a minimum amount of energy.

DISCLOSURE OF THE INVENTION

The invention is a system for removing hydrocarbon contaminates from groundwater and moisture-ladened soil. In detail, the invention comprises a pump to deliver the contaminated water through a heat exchanger to a stripping tower, preferably a steam stripping tower. The contaminated water enters the tower through the top while steam would be injected near the bottom. The resulting counterflow "strips" the hydrocarbon contaminates from the contaminated water with the clean water existing from the bottom of the tower while contaminated steam and the vaporized hydrocarbon contaminates exit the top. The heated clean water is passed through the heat exchanger and thus, heats the incoming contaminated water bringing it up to or near processing temperature. The clean water can then be reinjected into the ground or pumped to storage tanks for later usage.

The contaminated steam and vaporized hydrocarbon contaminates are thereafter passed through a first condenser where they are cooled by contaminated water cycled to and from the inlet line to the stream stripping tower upstream of the heat exchanger. In the first condenser, some of the steam and some of the hydrocarbon contaminates are condensed and exit at the bottom thereof. The remaining contaminated steam and still-vaporized hydrocarbon contaminates are drawn off from the first condenser by means of a vacuum pump in series with both it and the tower.

Thus, with a vacuum drawn in the steam-stripping tower and first condenser, steam can be produced at a lower temperature and the vapor pressure of the hydrocarbon contaminates is also reduced. This, of course, reduces energy consumption. Furthermore, with this portion of the system operating below atmospheric pressure, any leaks will be into the system, not out, therefore reducing the chance of accidental release of hydrocarbon contaminates into the atmosphere.

The vacuum pump pumps the remaining contaminated steam and uncondensed hydrocarbon contaminates at above atmospheric pressure into a second condenser. This second condenser is cooled by clean water taken upstream of the heat exchanger and returned at the clean water outlet of the steam-stripping tower. Thereafter, the non-condensed hydrocarbon contaminates, condensed hydrocarbon contaminates, and contaminated water (the condensed steam) passes on to a gravity separator along with the contaminated water and condensed hydrocarbon contaminates from the first condenser. Here, the contaminated water is separated and pumped to a holding tank for recycling. The condensed hydrocarbon contaminates are pumped to a storage tank. The remaining uncondensed hydrocarbon contaminates are passed through activated charcoal beds wherein they are absorbed. The clean air from the beds can either be reinjected into the ground or released to the atmosphere.

The hydrocarbon contaminated moisture-ladened soil gas enters the system and passes directly to a third condenser wherein moisture is removed and condensed into contaminated water which is also pumped into the holding tank for processing. The remaining uncondensed hydrocarbon contaminates are pumped directly to the activated charcoal beds.

The system also incorporates a steam cleaning system for back flushing the activated charcoal beds such that contaminates from the beds are recycled to the second condenser. In fact, by having two or more separate activated charcoal beds, one can be simultaneously cleaned while the second is in service.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a schematic representation of a typical industrial area wherein the groundwater and soil gas have been contaminated with volatile hydrocarbon chemicals.

Illustrated in FIGS. 2A and 2B is a schematic representation of the subject system for removing hydrocarbon contaminates from groundwater and moisture-ladened soil.

BEST MODE FOR CARRYING OUT THE INVENTION

Figure 1:
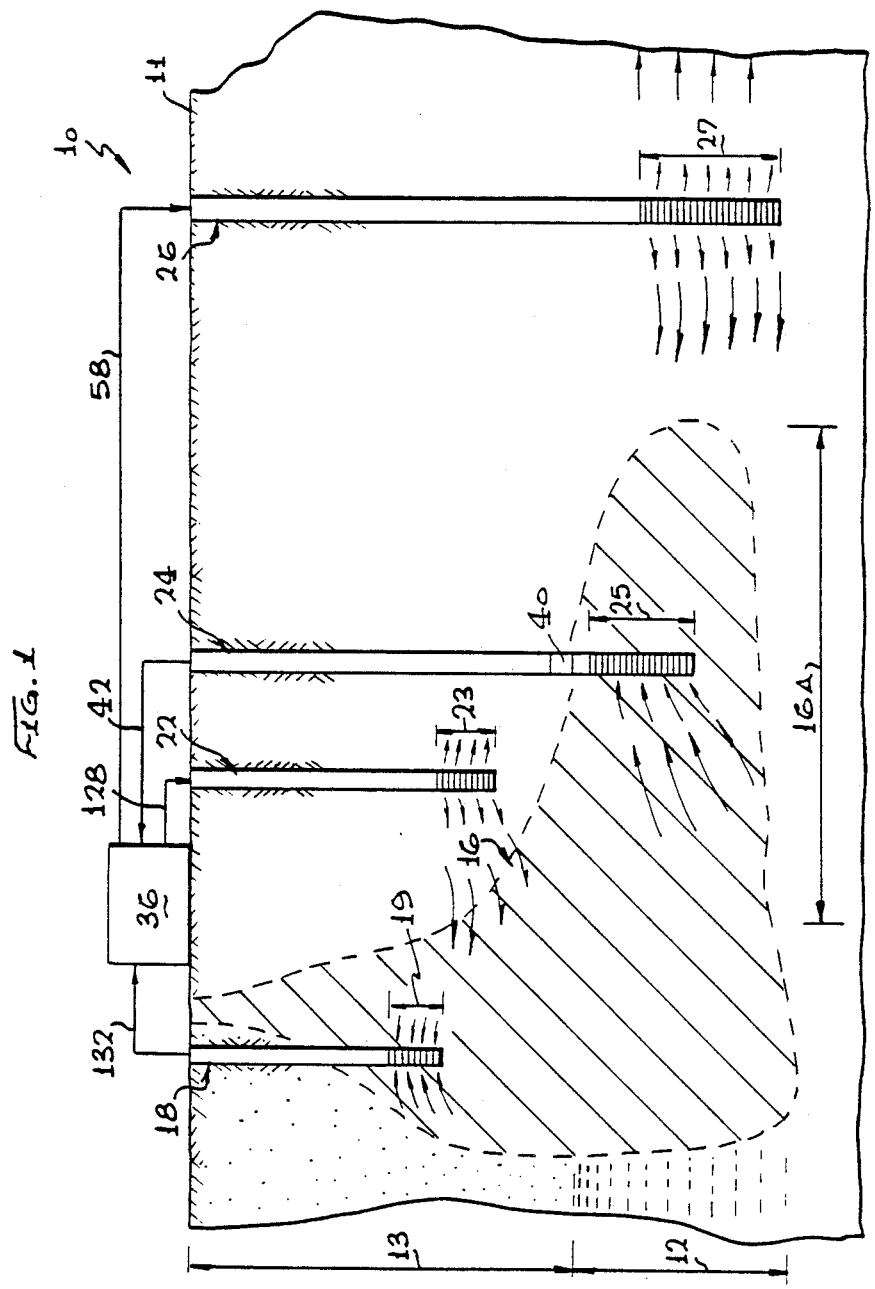

Illustrated in FIG. 1 is a schematic-type cross-sectional view of a typical contaminated groundwater area, generally indicated by the numeral 10. Well below the surface 11 is a layer of groundwater, indicated by numeral 12, shown flowing to the right. Such groundwater is often erroneously labeled as an underground river because the water is flowing; however, the flow rate is typically measured in feet per year. Above the layer of groundwater 12 is a layer of moisture-ladened soil, indicated by numeral 13, extending from the surface 11 to the layer of groundwater 12. A typical zone 16 of hydrocarbon contamination is shown extending from the surface 11 into the path of the groundwater 12. A portion 16A of the zone of contamination is shown having migrated downstream drawn there along with the groundwater. Thus, both the soil and groundwater must be decontaminated. To accomplish this a soil gas extraction well 18 has been drilled to a depth extending into the layer 13 and having an entrance flow area along a portion 19 of its length. An injection well 22, having an exit flow area along a portion 23 of its length, has been drilled "downstream" of the well 18 to a greater depth. This well 22 is used to reinject the cleaned gas (which is air). Note that because the well 22 extends to a lower depth than the well 18, as air is extracted along with the fact that the pressure around the portion 23 of the well 22 is greater than the zone around the portion 19 of the well 18, the contaminated moisture-ladened air will flow toward well 18 aiding in the extraction process.

Groundwater extraction well 24 is shown having been drilled to a depth within the migration zone portion 16A, having an entrance flow area portion, indicated by numeral 25. Finally, a ground water injection well 26, having an exit flow area portion 27, has been drilled downstream of the zone of contamination 16 (beyond portion 16A) to a greater depth than well 24 when water is extracted, however, still within the layer of groundwater 12. As the contaminated groundwater is pumped up through well 24, clean water is injected via well 26. Thus, (1) with the groundwater tending to flow toward the well 24, (2) with a lower pressure area being generated about the portion 25 of well 24, and (3) a higher pressure area generated about the exit flow area portion 27 of well 26; the contaminated groundwater will tend to flow toward well 24, aiding in the extraction thereof.

Figure 2B:
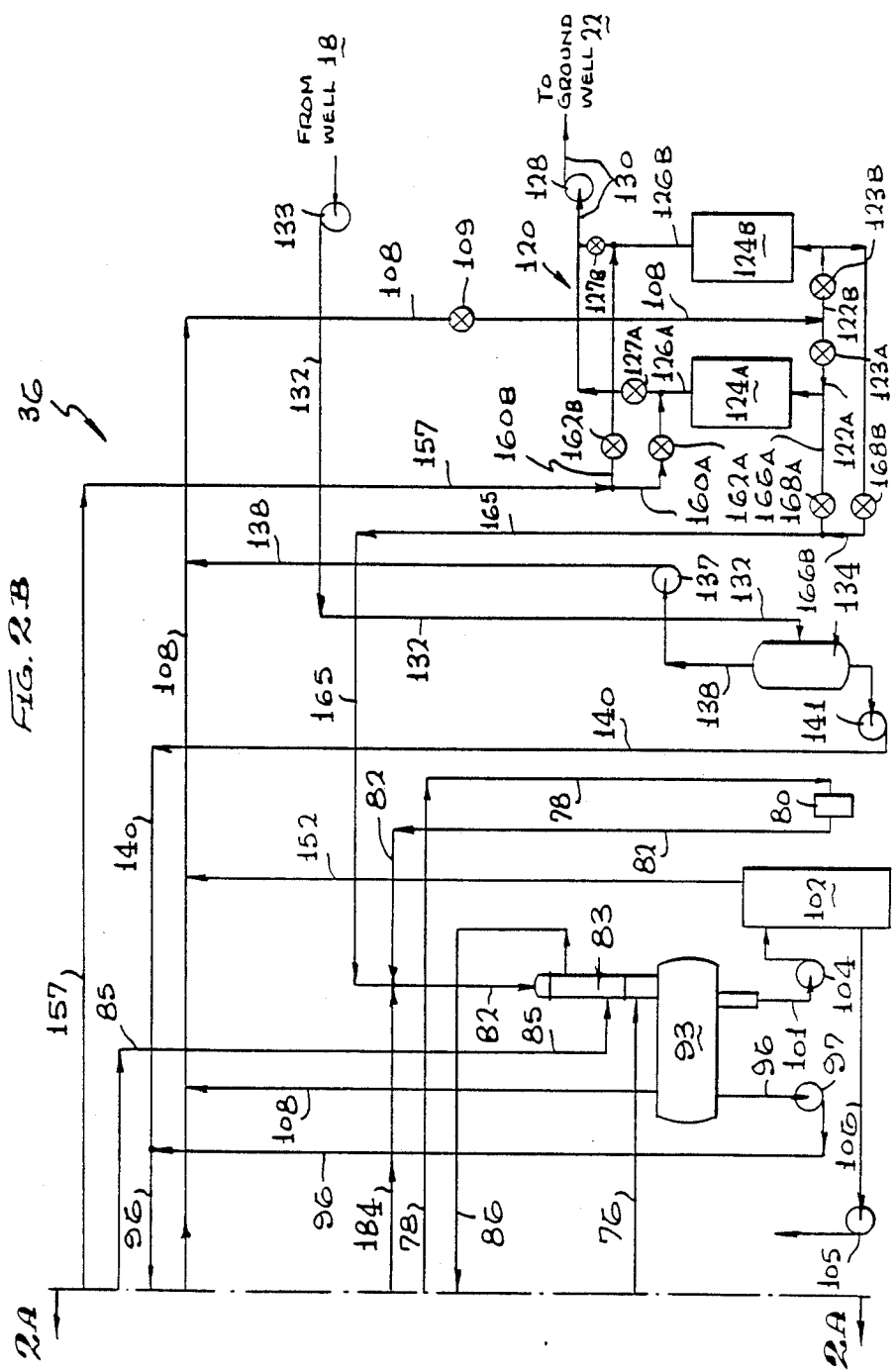

Illustrated in FIGS. 2A and 2B is a schematic-type representation of the system for removing hydrocarbon contaminates from water and moisture-ladened air, generally designated by 36. Because of the relative complexity of the system, it is broken into two parts on two sheets of drawings so that the individual elements thereof can be better illustrated and understood. Still referring to FIG. 1 and additionally to FIGS. 2A and 2B, a groundwater pump 40 in well 24 is used to pump the contaminated water from the extraction well 24 into line 42, through the heat exchanger 43, and into a steam-stripping tower 44 at its upper midpoint 46. The steam-stripping tower 44 is a conventional design and can be manufactured by numerous companies; thus, it need not be discussed in detail in this specification. Suffice to say that the contaminated water enters near the top of the tower while steam is injected near the bottom. The resulting counterflow, through droplet-forming materials, strips the hydrocarbon contaminates from the contaminated water. The clean water exits at or near the bottom of the tower while contaminated steam and vaporized hydrocarbon contaminates exit at the top. In the system illustrated, a source of steam 48 whose pressure is controlled by regulator 49, is fed into line 50 which connects at the mid-bottom 52 of the tower 44. The clean water exits at the bottom 54 of the tower 44 and is pumped out therethrough by means of pump 56 via line 58 through the heat exchanger 43 for subsequent reinjection into the ground via well 26 (FIG. 1). However, the clean water could just as well be pumped to storage tanks (not shown) for subsequent distribution to public water companies. Thus, the heat exchanger 43 uses the exiting heated clean water to heat the incoming groundwater and bringing it up to processing temperatures. This improves efficiency and reduces the amount of steam necessary for the stripping operation. It should be noted that, while a steam stripping tower is shown and described, an air stripping tower could also be used. In such a tower, heated air is injected at the bottom of the tower, however the outputs remain essentially the same except heated air would also exit at the top.

The contaminated steam and vaporized hydrocarbon contaminates exit via line 60 at the top 62 of the tower 44. Note that in this design a vacuum (typically 50 millimeters of mercury) is drawn in a manner to be subsequently discussed, in the line 60, thus reducing the pressure within the tower 44. This allows the steam to be developed at a much lower temperature of around 100° F., further conserving energy. It also lowers the vapor pressure of the hydrocarbon contaminates.

The contaminated steam and vaporized hydrocarbon contaminates are next passed through a first condenser 70 where they are cooled by incoming contaminated water. The contaminated water enters by inlet line 72 and exits via outlet line 74, both of which connect to line 42 upstream of the heat exchanger 43. In the condenser 70, contaminated water (some of the steam is condensed) and some of the hydrocarbon contaminates which have been condensed exit via line 76 and are pumped therethrough by pump 77. The remaining uncondensed contaminated steam and uncondensed hydrocarbon contaminates exit via line 78, drawn there through by vacuum pump 80.

Thus the vacuum pump 80 not only reduces the pressure within the tower 44 to below atmospheric pressure but also that within the condenser 70. By keeping the pressure within the connecting lines and the tower 44 and condenser 70 below atmospheric, any leaks in the system to this point will be from the atmosphere into the system. This is of major importance in that not only is energy consumption reduced, but as previously mentioned, the chance of the hydrocarbon contaminates being released into the atmosphere is also reduced.

The vacuum pump 80 pumps the remaining non-condensed contaminated steam and hydrocarbon contaminates into line 82 into a second condenser 83. The incoming mixture in the condenser 83 is cooled by clean water from line 58 via incoming line 85 coupled to line 58 upstream of the heat exchanger 43 and returned via line 86 which couples to line 58 at the bottom of the tower 44 before the pump 56. By using contaminated water to cool the incoming mixture in condenser 70 and the clean water to cool the incoming mixture in condenser 83, the need for a powered chiller is eliminated, thus further reducing energy consumption.

Thereafter, the non-condensable hydrocarbon contaminates, in vapor form, condensed hydrocarbons, and contaminated water (condensed steam) from condenser 83 pass into gravity separator 93, along with the contaminated water pumped from condenser 70 through line 76. In the gravity separator, the contaminated water is separated and passes into line 96 and is pumped by pump 97 into holding tank 100. Condensed hydrocarbon contaminates exit via line 101 and are fed into tank 102 by means of pump 104. From tank 102 the condensed hydrocarbon contaminates can be pumped via pump 105 through line 106 to tank trucks and the like for transferral to remote processing plants.

The uncondensable hydrocarbon contaminates exit the gravity separator 93 via line 108, having a control valve 109 mounted therein, and on to granulated activated charcoal absorber bed system 120. The line 108 splits into a first line 122A, having valve 123A mounted therein, which connects to the bottom of an absorber tank 124A and also into a second line 122B, having valve 123B mounted therein, which connects to the bottom of absorber tank 124B. Outlet lines 126A and 126B, having valves 127A and 127B mounted therein, respectively, are connected to the top of the tanks 124A and 124B, respectively, and thereafter both connect to pump 128 via line 130. The tanks 124A and 124B contain activated charcoal beds for absorbing the hydrocarbons. At least two tanks are used so that one is always on line while the other is being cleaned; the cleaning process will be subsequently discussed. Thus, for purposes of illustration, assume tank 124A is in operation and tank 124B is being cleaned. In this case, valve 109 would be open as well as valves 123A and 127B while valves 123B and 127B would be closed. The non-condensable hydrocarbon contaminates are passed into absorber tank 124A where they are absorbed and the now clean air passes out line 126A and into line 130 where pump 128 pumps it into injection well 22 (see FIG. 1). Of course, the clean air could be released to the atmosphere, if so desired. If tank 124B were in operation, valves 123A and 127B would be closed and valves 123B and 127A would be open and the clean air would pass out line 126B into line 130.

The hydrocarbon contaminated moisture-ladened air enters the system via line 132 pumped up pump 133 mounted therein and is passed through a third condenser 134 wherein the moisture is condensed into contaminated water. The remaining hydrocarbon contaminated air exits the third condenser via line 138, pumped therefrom by pump 137 into line 108 and, thus, to the absorber bed system 120. The contaminated water exits the condenser 134 via line 140 pumped by pump 141 into line 96 to the holding tank 100.

Also of importance is the fact that tank 100 is coupled along with tank 102 to line 108 via lines 150 and 152, respectively. Thus any vapors collecting in the tanks 100 and 102 are also passed through the absorber bed system 120.

The individual tanks 124A and 124B of the absorber system 120 can be cleaned by back flushing with steam from line 50. This is accomplished by coupling the absorber system 120 to line 50 by means of line 157 having a valve 158 mounted therein. The line 157 is coupled to line 126A via line 160A having a valve 162A mounted therein, and to line 126B via line 160B having a valve 162B mounted therein. Line 122A is coupled to a return line 165 via line 166A having a valve 168A mounted therein and line 122B is coupled to the line 165 via line 166B having a valve 168B mounted therein. Line 165 is coupled to line 82 which, of course, is coupled to second condenser 83. With the steam flowing in line 157, valve 158 is opened, allowing steam to reach the absorber bed system 120. For purposes of illustration, assume that absorber tank 124B is on line and absorber tank 124A is to be back flushed. The steam would be used to back flush absorber tank 124A by opening valves 162A in line 160A and valve 168A in line 166A while closing valves 162B and 127A in lines 160B and 126A, respectively. Valve 123A in line 122A would be closed, as well as valve 168B in line 166B, allowing the steam to back flush the absorber tank 124A, forcing the absorbed hydrocarbon contaminates into line 165 and 82 and into condenser 83. Absorber tank 124B, with valves 123B in line 122B and valve 127B in line 126B open, remains on line. If absorber tank 124A were on line and absorber tank 124B was to be cleaned, valves 123B, 127B, 162A and 168A would be closed, and valves 123A, 127A, 162B and 168B would be open. Thus, it is possible to clean either the absorber tank 124A or 124B while the system 36 remains in operation.

An additional feature is the ability to flush portions of the system at start-up by use of steam before pump 80 is on line. This can be accomplished by coupling the inlet of a condenser 172 to line 50 by means of line 174 having a valve 176 and an ejector 177 series mounted therein. The ejector 177 is coupled to line 78 via line 178 having a valve 179 mounted therein. The outlet of the condenser 172 is coupled to line 108 via line 180 having valve 182 mounted therein and also to line 82 via line 184. Thus, with valve 158 closed and valve 176 open, steam will flow into line 174 through ejector 177. With the valve 179 open, the steam flowing through ejector 177 will "draw" a vacuum in line 78, the tower 44 and condenser 70 "pulling" residual contaminates therefrom. The steam and contaminates in line 174 passes into condenser 172 wherein the contaminated water (condensed steam) therefrom passes through line 184 into line 82 and to condenser 83. Any uncondensed hydrocarbon vapors pass through line 180 (valve 182 is open) directing the vapors to absorber system 120.

Thus it can be seen that the system (1) can operate in a closed-loop, (2) has a significant portion of the system operating below atmospheric pressure reducing the possibility of leaks to the atmosphere, (3) consumes a minimum amount of energy, and (4) incorporates a self-cleaning filter system or the like. Furthermore, the clean water can be returned to the ground or be transferred to a municipal water system. The clean air can be vented to the atmosphere or returned to the ground. Of course it should be clear that the system is not limited to the decontamination of groundwater and could be used on any source of hydrocarbon contaminated water and, in fact, any volatile that can be steam stripped from water.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention has applicability in the removal of volatile hydrocarbon contaminates from both water and moisture-ladened air and, in particular, to the removal of such contaminates from groundwater.

I claim:

1. A system for simultaneously removing hydrocarbon contaminates from water and moisture-ladened air comprising:

stripping means for stripping the hydrocarbon contaminates from the contaminated water providing heated clean water and a first mixture of hydrocarbon contaminated steam and vaporized hydrocarbon contaminates;

a first condenser means for receiving the first mixture and condensing a portion thereof providing a second mixture of contaminated water and condensed hydrocarbon contaminates and the remaining portion of the first mixture substantially comprising uncondensed hydrocarbon contaminates;

separator means for receiving the contaminated water and condensed hydrocarbon contaminates from said first condenser means and the uncondensed hydrocarbon contaminates and providing separated condensed contaminated water, condensed hydrocarbon contaminates and uncondensed hydrocarbon contaminates;

a second condenser means for receiving hydrocarbon contaminated moisture-ladened air providing contaminated water and uncondensed hydrocarbon contaminates; and absorber means for receiving the uncondensed hydrocarbon contaminates from said second condenser means and said separator means for absorbing same.

2. The system as set forth in claim 1, wherein said first condenser means comprises:

a third condenser for receiving the first mixture and condensing a portion thereof providing the second mixture of contaminated water and condensed hydrocarbon contaminates and the remaining portion of the first mixture; and a fourth condenser for receiving the remaining portion of the first mixture from the third condenser and condensing a second portion thereof providing condensed contaminated water and condensed hydrocarbon contaminates and a remaining portion of the first mixture substantially comprising uncondensed hydrocarbon contaminates.

3. The system as set forth in claim 2, wherein said separator means is a gravity separator for receiving the contaminated water condensed hydrocarbon contaminates and the uncondensed hydrocarbon contaminates from said third and fourth condensers and providing separated condensed contaminated water, condensed hydrocarbon contaminates and uncondensed hydrocarbon contaminates.

* * * * *